July 5, 1949.  G. V. ELTGROTH  2,475,179
Q METER

Filed May 3, 1944  3 Sheets-Sheet 1

INVENTOR
GEORGE V. ELTGROTH
BY David F. Doody
ATTORNEY

July 5, 1949.  G. V. ELTGROTH  2,475,179
Q METER

Filed May 3, 1944  3 Sheets-Sheet 3

INVENTOR
GEORGE V. ELTGROTH
BY David F. Doody
ATTORNEY

Patented July 5, 1949

2,475,179

UNITED STATES PATENT OFFICE 2,475,179

Q METER

George V. Eltgroth, Towson, Md., assignor to Bendix Aviation Corporation, South Bend, Ind., a corporation of Delaware Application May 3, 1944, Serial No. 533,973

7 Claims. (Cl. 175—183)

This invention relates to apparatus for testing electrical circuits and more particularly to equipment for determining the losses and Q of resonant circuits and of components used in such circuits.

The commonly accepted criterion of the selectivity of tuned circuits in this country is the Q of such circuits, by which term is meant the ratio of reactance to effective resistance. In the case of resonant elements of a distributed nature, such as lines, this expression for Q becomes meaningless because of the impossibility of determining the characteristics of the component admittances, for which reason another definition is sometimes adopted, namely, that Q is given by the ratio of reactive to active volt amperes. The accurate determination of the circuit Q is of considerable importance in the design of radio receiving and transmitting equipment, as a result of which a number of methods for determining Q have been devised. Earliest of these was the half power method, in which the frequency of the impressed energy is adjusted first for a current or voltage maximum in the circuit under test, and is next adjusted successively above and below the resonance frequency to a point at which the current or voltage becomes 0.707 of the previously obtained maximum. The data thus obtained is then utilized for the computation of the Q. The inconvenience and complexity of determinations by this method are obvious, but it prevailed for some time, until the present simplified procedure was worked out.

In the presently available apparatus, a known voltage is injected into a tuned circuit composed of lumped elements, and the resulting voltage across the circuit is measured on a vacuum tube voltmeter. The ratio of the two voltages is determined by the Q of the circuit so that, by maintaining the injected voltage constant, the vacuum tube voltmeter may be, and is customarily, calibrated in terms of the circuit Q. While readily usable with circuits having lumped constants, this method is, unfortunately, of greatly diminished value, accuracy and convenience when measurements are to be performed on circuits having distributed impedances, such as resonant lines and the like. Further, the accuracy of the method is greatly vitiated when elements under test, such as coils, have large distributed admittances. With the advent of truly commercial employment of frequencies higher than 50 megacycles per second, in which lines are perforce employed as resonant elements, the lack of equipment for rapidly, accurately and conveniently measuring the Q of the operating circuits constitutes a very real obstacle to the rapid design of equipment to precise specifications. The performance of available components cannot be accurately compared without laboriously building them into the intended operating circuits and making detailed and lengthy test measurements.

Accordingly, a principal object of the invention is to provide new and novel means for determining the losses in resonant circuits and components for use therein.

Another object of the invention is to provide new and novel apparatus for determining the Q of resonant circuits incorporating distributed impedances.

A further object of the invention is to provide new and novel Q measuring apparatus delivering indications on a phase meter.

Yet another object of the invention is to provide new and novel direct reading Q measuring apparatus in which indications are substantially unaffected by the point of attachment to the circuit under test.

Still another object of the invention is to provide new and novel direct reading Q measuring apparatus in which indications are independent of the energy level in the circuit under test.

Yet a further object of the invention is to provide new and novel direct reading Q measuring apparatus in which the scale distribution is more favorable to accuracy than in present apparatus.

The above objects and advantages of the invention are substantially accomplished by impressing an amplitude modulated energy wave on a resonant circuit and measuring the phase shift of the modulation envelope of the voltage wave appearing across the circuit relative to the modulation envelope of the impressed energy.

Other objects and advantages of the invention will in part be disclosed and in part be obvious when the following specification is read in conjunction with the drawings in which:

Figure 1 schematically portrays a circuit of the type to be tested.

For the purposes of this specification, the measurement of circuit losses and the measurement of circuit Q will be considered equivalent, as the circuit reactance is normally substantially constant, making the Q inversely proportional to the effective circuit series resistance.

Figure 1:
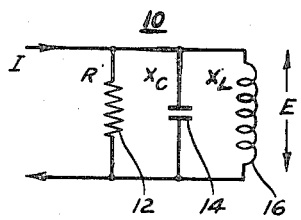

A careful consideration of the characteristics of the circuit of Figure 1 will be of considerable assistance in understanding the operation of the Q measuring apparatus disclosed. The circuit 10 comprises a parallel connected resistor 12, capacitor 14 and inductance 16. The phase angle of this circuit is readily shown to be $$\theta = \arctan -R\frac{(X_L - X_c)}{X_L X_c} \quad (1)$$

By taking $f_0$ as the frequency at which $$X_L = X_c = X_0$$

and $$= \frac{R}{X_0}$$

a simplified equation is derived which is $$\theta = \arctan -Q\left[\frac{f}{f_0} - \frac{f_0}{f}\right] \quad (2)$$

where $f$ is the frequency of the impressed voltage or current. Expressing $f$ as $(1+a)f_0$ in which $a$ equals the decimal deviation, an additionally simplified equation is derived.

$$\theta = \arctan -Q \cdot a\left[1 + \frac{1}{1+a}\right] \quad (3)$$

In practice $a$ is generally less than $10^{-2}$, permitting the simple expression $$\theta = \arctan 2Q \cdot a \quad (4)$$

Figure 2:
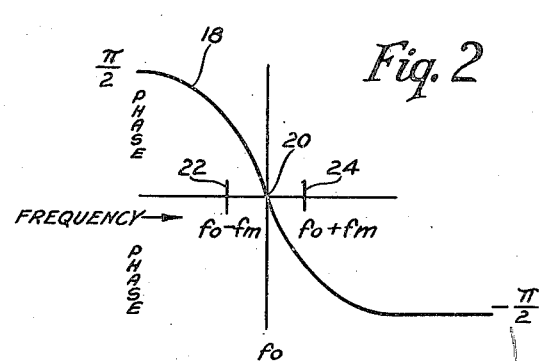
Figure 2 illustrates the phase-frequency characteristic of the circuit of Figure 1.

The curve 18 of Figure 2 is a plot of the Equation 3 and shows that at very low frequencies the circuit possesses a positive phase angle, while at frequencies above $f_0$ the phase angle is negative. This phase angle represents the change in relative phase between a current I of the given frequency passing through the circuit and the resulting voltage appearing across the circuit as designated by E in Figure 1. Equation 4 expresses the variation in phase occurring within the immediate region of the frequency $f_0$ which, as may be seen from Figure 2 is substantially, a straight line.

Figure 3:
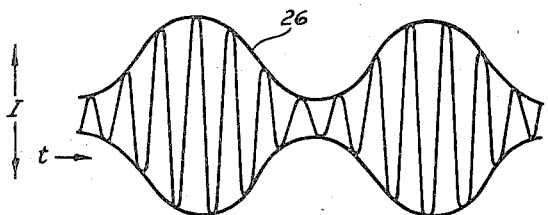
Figure 3 illustrates the wave form of a current used for the testing of the circuit of Figure 1.

If an amplitude modulated current wave, such as that shown in Figure 3, whose carrier frequency is equal to the resonant frequency of the circuit be passed through the circuit of Figure 1, the carrier frequency energy falls at the point 20 on the abscissa of Figure 2 and suffers no shift in phase, while the low frequency sideband energy falls at the point 22 and is shifted positively in phase, and the high frequency sideband energy falls at the point 24 and is shifted negatively in phase. From Equation 4 it is evident that when $a$ is small, this phase shift is symmetrical. The effect of these shifts on the voltage wave resulting across the circuit 10 will now be investigated.

The wave of Figure 3 is expressed by:

$$I = (1 + K \sin mt) \sin pt = \sin pt$$
$$+ \frac{K}{2} \cos (p-m)t - \frac{K}{2} \cos (p+m)t \quad (5)$$

K = per cent modulation
$p$ = carrier angular velocity
$m$ = modulation angular velocity
$(1 + K \sin mt)$ is the equation for the positive half of the envelope 26.

Passage of these current components through the parallel circuit 10 produces voltages corresponding to each current component, each of which is determined by the impedance presented by the circuit to that component. $m$, for the purpose of the exposition, is taken as 1% of $p$ or less, although this is not meant to imply that greater values of $m$ cannot be employed. The carrier, of course, sees a pure resistance causing the developed carrier voltage to be in phase with the carrier component of the current. The low frequency side band sees an impedance having a positive phase angle, which results in the developed voltage of corresponding frequency leading the current by some angle, and the high frequency side band sees an impedance having a negative phase angle, producing a developed voltage of corresponding frequency lagging the current by substantially the same angle. These phase shifts are the ordinates corresponding to the abscissas 22 and 24 of Figure 2. Taking the angle of phase shift as $\theta$, as defined in (3) and (4), the expression for the resulting voltage is:

$$E = E \max\left\{\sin pt + \frac{K}{2}\cos[(p-m)t + \theta] - \frac{K}{2}\cos[(p+m)t - \theta]\right\} \quad (6)$$

$$E = E \max[\sin pt + K \sin pt \sin(mt - \theta)] = E \max[1 + K \sin(mt - \theta)]\sin pt \quad (7)$$

Figure 4:
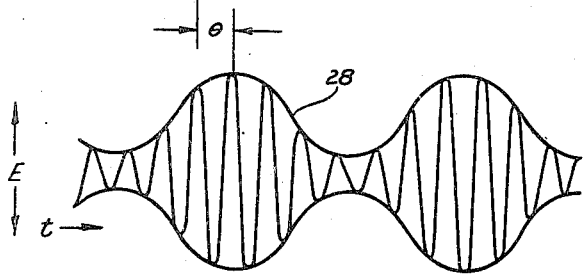
Figure 4 illustrates the voltage wave form appearing across the circuit of Figure 1.

Equation 7 is the expression for the voltage wave shown in Figure 4, and in this expression $[1 + K \sin(mt - \theta)]$ is the term defining the positive half of the envelope 28. A comparison of (7) with (5) indicates at once that the new envelope is simply a replica of the envelope of the impressed current wave displaced in a lagging direction by the angle $\theta$ and, since from (4), with constant $a$, $\theta$ is controlled by Q, the measurement of this phase angle affords a measure of the Q, and thereby, of the losses in the resonant circuit. The relative displacement angle, $\theta$, is at once seen from the relative position of the two envelopes 26 and 28 in Figures 3 and 4, which are plots of the equations concerned.

Figure 5:
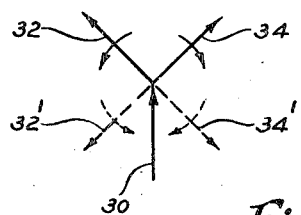
Figure 5 is a vector diagram of the carrier and associated sidebands.

Another method of visualizing the shift in the phase of the modulation envelope is afforded by the diagram of Figure 5 showing the conventional representation of a carrier vector 30 with its accompanying rotating side band vectors 32 and 34 in solid lines. Passage of the current represented by this diagram through the circuit 10 shifts the positions of the sideband vectors in the resulting voltage to the dashed positions 32' and 34' which obviously give rise to a wave envelope of displaced time phase. The foregoing explanations and diagrams are valid for all types of resonant elements exhibiting an impedance rise when excited with energy at the resonance frequency, whether these be of the lumped element or of the distributed element type, such as a resonant line.

Figure 6:
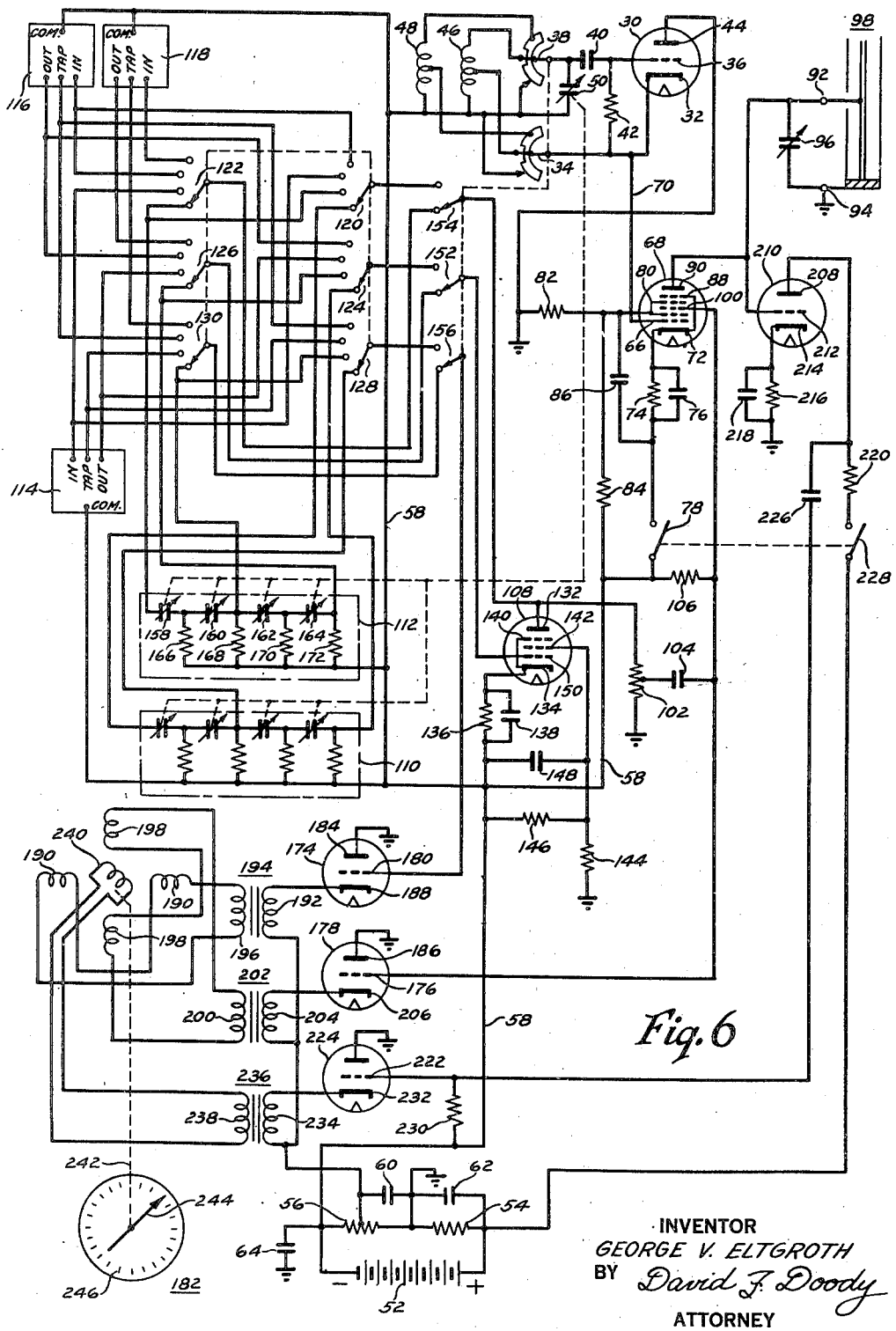
Figure 6 is a schematic diagram of loss or Q measuring apparatus constructed in accordance with the principles of the invention.

Apparatus for providing the required test energy and making the necessary phase measurements is schematically presented in Figure 6, wherein an oscillator tube 30 has a cathode 32 connected to the rotatable arm of selector switch 34, and a control grid 36 connected to the wiper arm of selector switch 38 through the grid capacitor 40. The grid 36 is connected to the cathode 32 for direct current by the grid leak resistor 42, and anode circuit excitation for the oscillator is provided by the connection of the anode 44 of tube 30 to ground, which is positive with respect to the cathode 32 due to the particular arrangement of the power supply to be later described. The cathode 32 of tube 30 is provided with an associated heater, as are the cathodes of the remainder of the tubes in the apparatus. The heater circuits have been omitted from the showing in the interest of simplicity since any of the many well known arrangements may be employed and such circuits form no part of the invention. By manipulation of the band selector switches 34 and 38, which are ganged with certain other switches to be later described, the tube 30 may be selectively connected with the coil 46 or coil 48, each of which is short circuited by an appropriate sector on the switch section when not in use, and shunted by the tuning capacitor 50 during the time that it is connected to the tube 30. The oscillator circuit employed is of the Hartley type with the cathode 32 connected to a tap on the tuned circuit inductance and the tuning capacitor 50 connected across the end terminals of said inductance. The end of the coils 46 and 48 opposite the grid terminal is connected through the negative common lead 58 to the negative terminal of the direct current source 52 bridged by the series connected resistors 54 and 56 whose junction terminal is grounded. Resistor 56 is tapped, and this tap is grounded through capacitor 60, as are the positive and negative terminals of source 52 through capacitors 62 and 64 respectively.

The ratio of inductance 46 to 48 may advantageously be 10:1 and the tuning ratio 3.16:1, as will later appear. The exact carrier frequency of operation is, of course, selected by adjustment of the variable capacitor 50. Due to the oscillations occurring in the L. C. circuit associated with tube 30, alternating voltages at the carrier frequency appear on the cathode 32, and are conveyed to the control grid 66 of the mixer tube 68 by the connecting lead 70. The cathode 72 of tube 68 is connected through resistor 74, shunted by capacitor 76, and switch 78 to the negative common 58, and the space charge grid 80 is connected to the positive ground through the dropping resistor 82. The potential of grid 80 is stabilized by the connection of resistor 84 to the common 58, and radio frequency energy is eliminated therefrom by capacitor 86 connected between grid 80 and the cathode terminal of the switch 78. A suppressor grid 88 is connected within the tube to cathode 72, and an anode 90 located within mixer tube 68 on the side of grid 88 opposite the cathode 72 is connected to the test terminal 92, which is here shown connected to the central conductor of a concentric line resonator 98 to be tested. The direct current anode circuit is completed through the central conductor of resonator 98, the shorting plug at its base, and the terminal 94 to ground. Inductive components in the impedance of the resonator at the carrier frequency can be balanced out by capacitor 96 bridged across terminals 92 and 94 within the equipment. The line 98 is then said to be resonated to the carrier frequency by capacitor 96. When working with linear resonators capacitor 96 may be eliminated unless required to simulate loading conditions, but its presence is desirable if the apparatus is also to be used for testing lumped elements, such as inductances.

With switch 78 closed, the alternating voltages on control grid 66 produce a current at the carrier frequency which flows through the resonator 98, and this current is modulated to provide the essential amplitude modulated energy through the action of outer control grid 100 in tube 68 which is excited from the tapped anode load 102 of the modulation frequency oscillator tube 108 through the coupling capacitor 104. The resistor 106 connected between control grid 100 and the negative common 58 serves as the necessary grid return path. This combination, thus impresses amplitude modulated energy corresponding to Figure 3 on the resonator 98. As pointed out in connection with Equation 4, to make the observed angle of phase shift a function of Q only, $a$, the decimal deviation, must be maintained constant, which is to say that the modulation frequency must bear a constant ratio to the carrier frequency. The modulation frequency must therefore be varied with the carrier frequency if operation at more than one frequency is necessary and if complicated corrections are to be avoided. The arrangement for this variation and the frequency determining circuits for the modulation frequency oscillator will now be discussed.

The modulation frequency oscillator is of the phase shift type employing four identical ladder connected R. C. networks, in each of five phase shift units, 110, 112, 114, 116, and 118. The various phase shift units are selectively connectable to the input and output of the modulation oscillator tube 108 through the six ganged range multiplier switches comprising switches 120 and 122 in the input circuits of the phase shift units, switches 124 and 126 in the output circuits of the phase shift units, and switches 128 and 130 controlling the tap connections to the phase shift units. The capacitors in the phase shift units may conveniently be mechanically linked to the tuning capacitor 50 and vary the modulation frequency in the same ratio as the carrier frequency is varied by capacitor 50. In the modulation frequency oscillator again, the ratio of the frequencies in the successive bands may preferably be $\sqrt{10}$ or 3.16. As the operation of the modulation frequency oscillator is identical on all bands, differing only in frequency, a detailed description and discussion will be presented only for the highest modulation frequency band or lowest Q range, on the low carrier frequency band, which is controlled by the phase shift unit 112.

If 45 degrees envelope phase shift is desired when testing a circuit whose Q is 200 and the minimum carrier frequency with coil 46 in circuit is 10 megacycles, the minimum frequency to be developed in phase shifter 112 is 25 kilocycles, rising to a maximum of 79 kilocycles when the carrier frequency is 31.6 megacycles per second. The tube 108 producing the oscillations has an anode 132 connected to the positive ground through the tapped anode load 102, while its cathode 134 is connected to the negative common 58 through bias resistor 136 shunted by the bypass capacitor 138. A suppressor grid 140 adjacent anode 132 is connected within the tube to the cathode 134 and surrounds the space charge grid 142 which is connected to the positive ground through the dropping resistor 144, the potential of grid 142 being stabilized by the connection of bleeder resistor 146 from the grid 142 to the cathode 134 in shunt with the bypass capacitor 148. The control grid 150 of tube 108 is connected to the wiper arm of switch section 152, and the anode 132 is connected to the wiper arm of switch section 154 which switches connect these elements to range switch sections 126 and 122, or 124 and 120, respectively, depending on whether the band switches 34 and 38 are in the low or high frequency position. The necessary synchronism of operation when the carrier operating band is switched is insured by ganging switch sections 152 and 154 with the band switches 34 and 38, and included in this ganged group is the switch section 156 which is in the control grid circuit of one of the phasemeter exciting tubes, whose circuit will be later detailed.

With the switches in the position shown, the anode 132 is connected through switches 154 and 122 to the input capacitor 158 of the phase shifting unit 112 comprising the series connected capacitors 158, 160, 162 and 164 whose respective junction points are connected to the negative common 58 by resistors 166, 168, 170 and 172. The output voltage appearing across resistor 172 passes through switches 126 and 152 to the control grid 150. The sections in the phase shifter 110 are identical, and oscillations are produced in the circuit at such a frequency that the voltage on grid 150 is 180 degrees out of phase with the alternating voltage component at anode 132, so that each section contributes 45 degrees of leading phase shift. Therefore the voltage across resistor 168 is 90 degrees out of phase with that appearing at the tap on load resistor 102. The tap on resistor 102 is so positioned that the potential appearing thereat is equal to that developed across resistor 168 to enable the use of the two voltages to symmetrically excite the two windings of a phasemeter, and the voltage at resistor 168 is tapped off and fed through switch sections 130 and 156 to control grid 180 of the phasemeter exciting tube 174. Similar taps are brought out from each of the remaining phase shift units 110, 114, 116 and 118 to provide for phasemeter excitation. The other phasemeter excitation voltage is taken from the tap on resistor 102 and fed to the control grid 176 of the phasemeter exciter tube 178. These connections are similar for each of the phase shift units. As earlier intimated, the capacitors 158, 160, 162 and 164 are linked and tracked with tuning capacitor 50 to control the modulation frequency in accordance with the carrier frequency in a manner maintaining the quantity $a$, the decimal deviation of the sidebands, constant. Phase shift unit 112 supplies the frequency required for a center scale Q reading (45 degrees envelope phase shift) of 200 and covers the range 25 to 79 kilocycles corresponding in the carrier range 10–31.6 megacycles per second. In the same carrier range, on range multiplier position two, the phase shift unit 114 controls the modulation frequency over the range 7.9–25 kilocycles per second for a center scale Q reading of 732, on range multiplier position three, the phase shift unit 116 controls the modulation frequency over the range 2.5–7.9 kilocycles per second for a center scale Q reading of 2000, and on range multiplier position 4 the phase shift unit 118 controls the modulation frequency over the range 790–2500 cycles per second for a center scale Q reading of 7320. The capacitors in all the phase shift units are varied with variation in capacitor 50 in a manner maintaining the decimal deviation of the side band frequencies constant.

Upon placing the band selector switches 34 and 38 in the high frequency position, inductance 48 is switched into the circuit and the carrier frequency range becomes 31.6–100 megacycles per second, and at the same time control of the anode and grid circuits of the oscillator tube 108, and of the circuit to the control grid 180 of the phasemeter exciting tube 174 is transferred from the switches 122, 126 and 130 to switches 120, 124 and 128 respectively. Now, with the range selector in position one, as shown in the drawing, the modulation frequency is controlled over the range 79–250 kilocycles per second by phase shift unit 110, with the range selector in position two the modulation frequency is controlled by phase shift unit 112 over the range 25–79 kilocycles per second, with the range selector in position three the modulation frequency is controlled by phase shift unit 114 over the range 7.9–25 kilocycles per second, and with the range selector in position four the modulation is controlled by phase shift unit 116 over the range 2.5–7.9 kilocycles per second. The center scale readings on the phasemeter (45 degrees phase shift) are thereby maintained at the same values on the high frequency carrier band as on the low frequency carrier band, because the modulation frequencies have been altered in the same ratio. The advantage of the 3.16 ratio is evident as it makes possible the simple multiplication of the Q readings by a factor of ten with range change, and yet permits the use of a single phase shifter unit on each of the two carrier frequency bands. The internal details of the phase shifter circuits have been shown only for the units 110 and 112, it being understood that they may be the same in units 114, 116 and 118.

The voltages on control grids 176 and 180 of tubes 178 and 174 respectively are employed for the excitation of the reference windings of a phasemeter through cathode follower amplifying action of the tubes, whose anodes 184 and 186 are connected to the positive ground. The cathode 188 of tube 174 is connected through the primary winding 192 of the coupling transformer 194 to the tap on resistor 56, this point of connection providing operating bias for control grid 180. The energy appearing in the secondary winding 196 of transformer 194 is applied to one pair of reference windings 190 in the phasemeter 182, and the other reference winding pair 198 is fed from the secondary winding 200 of the coupling transformer 202 having the primary winding 204 connected between the cathode 206 of tube 178 and the tap on resistor 56. The two reference winding pairs are thus in space quadrature and are fed with currents in time quadrature to provide the familiar rotating field required in phasemeters of the type shown.

A voltage corresponding to the envelope of the voltage wave appearing in the resonator 98 under test is derived from the anode 208 of the tube 210 whose control grid 212 may be connected to the ungrounded test terminal 92. The cathode 214 of the tube 210, which functions as an anode bend detector, is returned to ground through the bias resistor 216 shunted by capacitor 218, and the anode 208 is connected to the positive terminal of source 52 through the anode load resistor 220 and switch 228 which is ganged with switch 78. The alternating voltage component appearing across resistor 220 is controlled by the envelope of the voltage wave appearing across resonator 98 and is applied to the control grid 222 of the envelope wave coupling amplifier tube 224 by the coupling capacitor 226. A direct current grid cathode circuit is completed by resistor 230 connected between grid 222 and the negative terminal of source 52, and by the connection of the cathode 232 of amplifier 224 to the tap on resistor 56 through the primary 234 of coupling transformer 236. The energy in winding 234 is transferred into the secondary winding 238 of transformer 236 and applied to the rotatable winding 240 of the phasemeter 182 which is coupled by the shaft 242 to the pointer 244 rotating over the graduated scale 246 in response to the various equilibrium positions which may be assumed by the winding 240.

Figure 7:
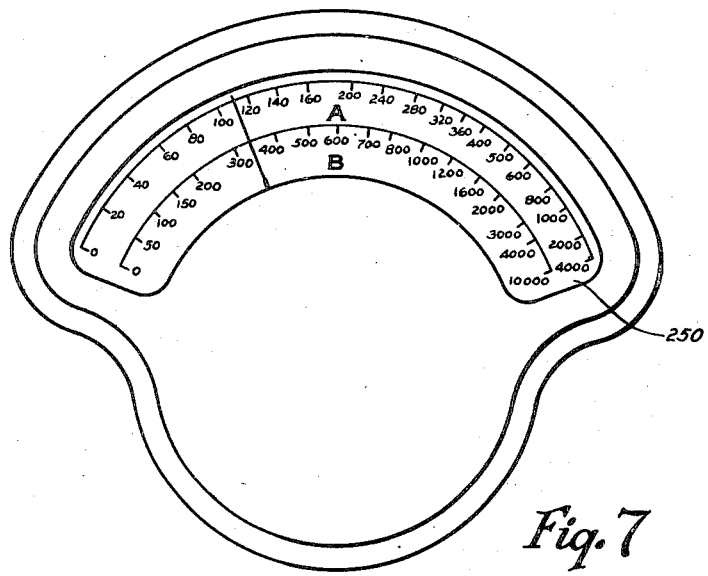
Figure 7 illustrates the scale distribution secured on the indicator.

The operation of the apparatus is quite simple and obvious from the previous discussion of the underlying theory. The mixer tube 68 produces an amplitude modulated carrier current which is passed through a portion of the central element of the resonator 98. The envelope of this amplitude modulated current is in phase with the voltage applied to the grid 100 from the modulation frequency generator, and as a result of this excitation there appears on the central member of resonator 98 an amplitude modulated voltage whose envelope is shifted in phase from the voltage on grid 100 an amount determined by the decimal deviation of the modulation frequency sidebands and the Q of the circuit connected to the terminals 92 and 94. This envelope voltage is employed to excite the rotatable winding 240 of phasemeter 182, whose reference windings are supplied from the modulating oscillator 108, and the reaction between the current in winding 240 and the fields of the reference windings of the phasemeter drive the pointer 244 of the phasemeter to a position determined by the Q of the circuit under test. The impressed carrier frequency is equal to that of the resonant circuit when the phasemeter reading is a maximum, and during the initial adjustment capacitor 50 and/or 96 may be reset for maximum meter reading to insure the necessary correspondence between resonant frequency of the circuit under test and the impressed frequency. As the phase shift of the envelope cannot exceed 90 degrees, all indications of the phasemeter may be confined to a 90 degree sector permitting the use of a meter having a scale distribution similar to that shown in Figure 7. Arc A on scale 256, which has been laid out to correspond to the values used for the purpose of explanation in this specification, is read when the range selector is in position one, as shown in Figure 6, arc B is read when the range selector is in position two, the readings of scale A are multiplied by ten when the range selector is in position three, and the readings of scale B are multiplied by ten when the range selector is in position four. The anode circuit of the mixer tube 68, in which ground is at a positive potential with respect to the cathode, was chosen to permit the tested circuit or circuit component to remain at ground potential for the prevention of electric shock to the user of the equipment. As a further precaution in this direction, the ganged switches 78 and 228 are provided to open the anode-cathode circuits of the tubes connected to the terminal 92 for the interruption of current flow while the tested circuits are being connected or disconnected.

Figure 8:
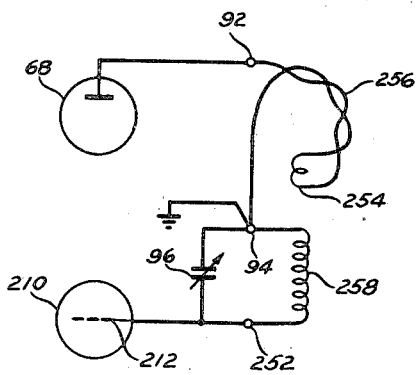
Figure 8 is a schematic diagram of an alternative coupling method for the circuit under test.

The test circuit connection of Figure 6 is quite satisfactory so long as the anode impedance of the mixer tube 68 is quite large with respect to the resonant impedance of the tested circuit. When this is not true, the resonant circuit may be more loosely coupled to the source of amplitude modulated energy as shown in Figure 8 where the amplitude modulated current flows from terminals 94 and 92 to the link coupling coil 254 through the flexible transmission lines 256. The tested coil 258 is now connected between terminal 94 and an additional terminal 252 insulated from ground which is connected to the control grid 212 of the detector tube 210. Capacitor 96 serves to tune the tested coil to resonance and the link coil 254 need be coupled to the tested coil 258 only closely enough to develop the voltage required for operation of the phasemeter. As the remainder of the internal circuits of the testing apparatus are not modified for use of the test circuit arrangement of Figure 8, the detail thereof is not repeated in Figure 8, it being understood that they are the same as in Figure 6.

There may be many applications in which a single range of Q indication may be sufficient in view of the favorable distribution of scale A. In this event, there will be need for but one range of modulation frequencies per carrier frequency band, effecting an appreciable simplification of the apparatus. In another alternative design, which may or may not retain the various ranges of Q indication, a single set of phase shifter unit capacitors may be ganged with the tuning capacitor 50 and the range of modulation frequencies changed by connecting resistors of the required values into the single phase shifter unit. The invention readily lends itself to these and many other modifications as determined by the specific application. It may be used to advantage in any portion of the radio frequency spectrum and is of service in testing circuits having lumped constants as well as those having distributed constants.

It will be obvious that many changes and modifications may be made in the invention without departing from the spirit thereof as expressed in the foregoing description and in the appended claims.

I claim:

1. In apparatus for determining the Q of a resonant circuit, a pair of test terminals between which said circuit is connected, means impressing upon said circuit by way of said terminals alternating current energy having the frequency which is the resonant frequency of said circuit, said energy being amplitude modulated, phase responsive indicating means, means impressing upon said indicating means energy conforming to the modulation envelope of said alternating current energy as defined by the current flowing at said terminals and means impressing upon said indicating means energy conforming to the modulation envelope of the voltage appearing across said terminals.

2. In apparatus for measuring the losses in a circuit component, a pair of test terminals between which said component is connected, means for impressing alternating current energy upon said component by way of said terminals, means for resonating said component at the frequency of said alternating current energy, said alternating current energy being amplitude modulated, phase responsive indicating means, means impressing upon said indicating means energy conforming to the modulation envelope of said alternating current energy as defined by the current flowing at said terminals and means impressing upon said indicating means energy conforming to the modulation envelope of the voltage appearing across said terminals.

3. Means for measuring the Q of a resonant circuit comprising: a pair of test terminals between which said circuit is connected; a source of alternating current energy having the frequency at which said circuit is resonant; a source of modulating energy; means impressing said modulating energy upon said source of alternating current energy; means impressing the output of said source of alternating current energy upon said test terminals; a phase responsive indicating device; means impressing said modulating energy upon said phase responsive indicating device; means demodulating the voltage appearing across said test terminals and means impressing the output of said demodulating means upon said phase responsive indicating device whereby said indicating device indicates the difference in phase between said modulating energy and the output of said demodulating means.

4. Means for measuring the Q of a resonant circuit comprising: a pair of test terminals between which said circuit is connected; a source of carrier frequency alternating current energy, said carrier frequency being at the resonant frequency of said circuit, a source of modulation frequency alternating current energy, means impressing said modulation frequency energy upon said source of carrier frequency energy to amplitude modulate the output thereof; means impressing the modulated output of said carrier frequency source upon said terminals; a phase responsive indicating device; means impressing said modulation frequency energy upon said indicating device; detecting means connected across said terminals and means applying the output of said detector to said indicating device, whereby said indicating device indicates the difference in phase between said modulating energy and the output of said detector.

5. In apparatus for determining the Q of a resonant circuit, means providing alternating current energy of controllable frequency, means for modulating said energy with a periodic wave, ganged frequency varying means for simultaneously varying the frequency of both said means to bring the frequency of said alternating current energy to the frequency of a resonant circuit being tested, the frequency of said modulating means being varied in a linear relationship and in the same sense with variation of the frequency of said energy providing means, a pair of test terminals across which said circuit is connected, means impressing said modulated energy upon said terminals, means deriving a current wave having a phase controlled by the phase of the envelope of the output of said modulating means, means deriving a current wave having a phase controlled by the phase of the envelope of the voltage wave at said terminals, phase responsive indicating means and means impressing said derived current waves upon said indicating means, whereby said indicating means indicates the difference in phase of said derived waves.

6. In apparatus for determining the Q of a resonant circuit, means providing alternating current energy of controllable frequency, means for modulating said energy with a periodic wave, ganged frequency varying means for simultaneously varying the frequency of both said means to bring the frequency of said energy providing means to the frequency of a resonant circuit being tested, the frequency of said modulating means being varied in a linear relationship and in the same sense with variation of the frequency of said energy providing means, means for changing said linear relationship, a pair of test terminals across which said circuit is connected, means impressing said modulated energy upon said terminals, means deriving a current wave having a phase controlled by the phase of the envelope of the output of said modulating means, means deriving a current wave having a phase controlled by the phase of the envelope of the voltage wave at said terminals, phase responsive indicating means and means impressing said derived current waves upon said indicating means whereby said indicating means indicates the difference in phase of said derived waves.

7. In circuit testing apparatus, means for impressing a signal in the form of modulated periodic electric wave energy on a circuit under test with a mean frequency substantially equal to a resonant frequency of said circuit, phase responsive indicating means, means for deriving wave energy having a phase controlled by the phase of the envelope of said signal, means for impressing said derived energy on said phase responsive indicating means, means for deriving wave energy having a phase controlled by the phase of the envelope of the periodic voltage appearing across said circuit in the region of signal impression, and means for impressing the last named wave energy on said phase responsive indicating means.

GEORGE V. ELTGROTH.

REFERENCES CITED

The following references are of record in the file of this patent:

UNITED STATES PATENTS

| Number | Name | Date |
| --- | --- | --- |
| 1,645,618 | Nyquist | Oct. 18, 1927 |
| 1,850,580 | Coram | Mar. 22, 1932 |
| 2,137,787 | Snow | Nov. 22, 1938 |
| 2,214,130 | Green et al. | Sept. 10, 1940 |
| 2,240,452 | Wolfskill | Apr. 29, 1941 |
| 2,252,870 | Slonczewski | Aug. 19, 1941 |
| 2,337,541 | Burgess | Dec. 28, 1943 |